(12) United States Patent
Lechkun et al.

(10) Patent No.: US 8,845,006 B2
(45) Date of Patent: Sep. 30, 2014

(54) POWER LIFTGATE IN A VEHICLE

(71) Applicant: Ford Global Technologies, LLC, Dearborn, MI (US)

(72) Inventors: David Michael Lechkun, Shelby Township, MI (US); Murat Gueler, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/724,088

(22) Filed: Dec. 21, 2012

(65) Prior Publication Data

US 2014/0175828 A1    Jun. 26, 2014

(51) Int. Cl.
*B60J 5/10* (2006.01)
*E05F 15/12* (2006.01)

(52) U.S. Cl.
CPC ............... *E05F 15/127* (2013.01); *B60J 5/106* (2013.01)
USPC ........................................ 296/146.8; 296/106

(58) Field of Classification Search
USPC ........... 296/146.8, 106, 56; 49/386, 324, 333, 49/334, 335, 336, 337, 338, 340, 341, 344, 49/345, 381, 387, 394
See application file for complete search history.

(56) References Cited

U.S. PATENT DOCUMENTS

| | | | |
|---|---|---|---|
| 3,860,288 A * | 1/1975 | Martin et al. | 298/23 MD |
| 3,990,739 A * | 11/1976 | Head | 296/56 |
| 6,115,965 A | 9/2000 | Jennings | |
| 6,341,809 B1 * | 1/2002 | Chapman | 296/56 |
| 7,320,198 B2 | 1/2008 | Berklich, Jr. et al. | |
| 7,866,729 B2 | 1/2011 | Porat et al. | |

* cited by examiner

*Primary Examiner* — Dennis H Pedder
*Assistant Examiner* — Beverly Becker
(74) *Attorney, Agent, or Firm* — Brooks Kushman P.C.; Frank A. MacKenzie

(57) ABSTRACT

A vehicle includes a liftgate that opens and closes to provide access to a rear storage compartment of the vehicle. A rotatable crossbar is attached to an upper portion of the vehicle and is connected to the liftgate via a bracket. A lever extends from an outer end of the crossbar. A retractable arm has a first end and a second end. The first end is attached to the vehicle body, and the second end is pivotally connected to the lever. Retraction of the arm pivots the lever, which rotates the crossbar and opens the liftgate. The arm and the lever are substantially concealed by a rear pillar of the vehicle so as to not be visible when operating to open and close the liftgate.

17 Claims, 4 Drawing Sheets

POWER LIFTGATE IN A VEHICLE

TECHNICAL FIELD

The present disclosure is directed to liftgate mechanisms in vehicles.

BACKGROUND

Vehicles such as hatchbacks, vans, sports utility vehicles (SUVs) and station wagons may include a rear door or liftgate. The liftgate provides access to the rear of the interior of the vehicle. These liftgates typically open upwards or sideways to expose the storage compartment of the vehicle. Actuating devices or power operators are known in the field to open and close the liftgate.

SUMMARY

According to one embodiment, a vehicle comprises a liftgate and a rotatable crossbar attached to an upper portion of the liftgate. At least one lever extends from at least one end portion of the crossbar. A retractable arm has a first end portion attached to a vehicle body, and a second end portion pivotally connected to the lever. The retraction of the arm pivots the lever in one direction, which rotates the crossbar in one direction and opens the liftgate. Similarly, extension of the arm pivots the lever in the opposite direction, which rotates the cross bar to close the liftgate. The arm and the lever are substantially concealed by a rear pillar of the vehicle, such that extension and refraction of the arm and rotation of the lever are hidden from view by the rear pillar. The arm and the lever are disposed within the rearward pillar of the vehicle according to multiple embodiments of the present disclosure.

According to another embodiment, a mechanism for actuating a liftgate of a vehicle is provided. A crossbar is attached to an upper portion of the liftgate. A lever extends from the crossbar. A retractable arm is connected to and offset from the crossbar via the lever. Linear movement of the arm pivots the lever which spins or rotates the crossbar. As such, retraction and extension of the arm rotates or pivots the lever and the crossbar to open and close the liftgate.

According to another embodiment, a subassembly for opening and closing a liftgate of a vehicle is provided. A rotatable crossbar spans generally the width of an opening of the rear of the vehicle. The crossbar is attached to both a vehicle body and to the liftgate. A retractable arm is at least partially concealed by a rearward pillar of the vehicle, such that the arm is substantially blocked from view. The arm is attached to and offset from the crossbar via a lever. Retraction of the arm pivots the lever to rotate the crossbar and open the liftgate. Similarly, extension of the arm pivots the lever in an opposite direction to rotate the crossbar and close the liftgate.

According to another embodiment, a liftgate actuating system is provided in which a power source supplies power to an arm. The arm is connected to a lever extending from a crossbar in an upper section of the vehicle. The power source is activated to move the arm between a first position and a second position. In the first position, the arm is extended, the lever and crossbar are in a first rotational position and the liftgate is closed. In a second position, the arm is retracted such that the length of the arm is reduced, the lever and crossbar are in a second rotational position and the liftgate is opened.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
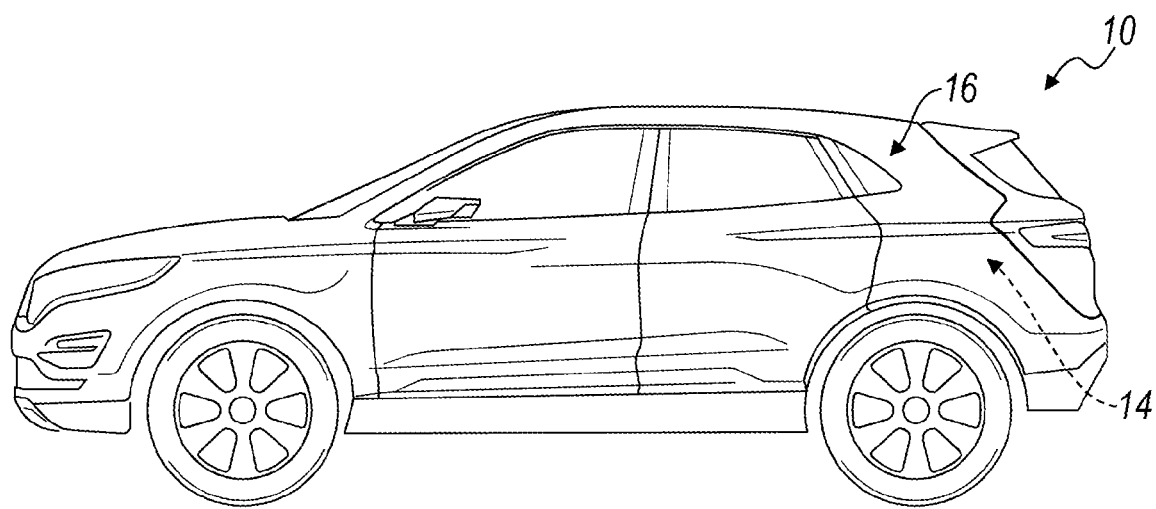
FIG. 1 is a side view of a vehicle.
Figure 2:
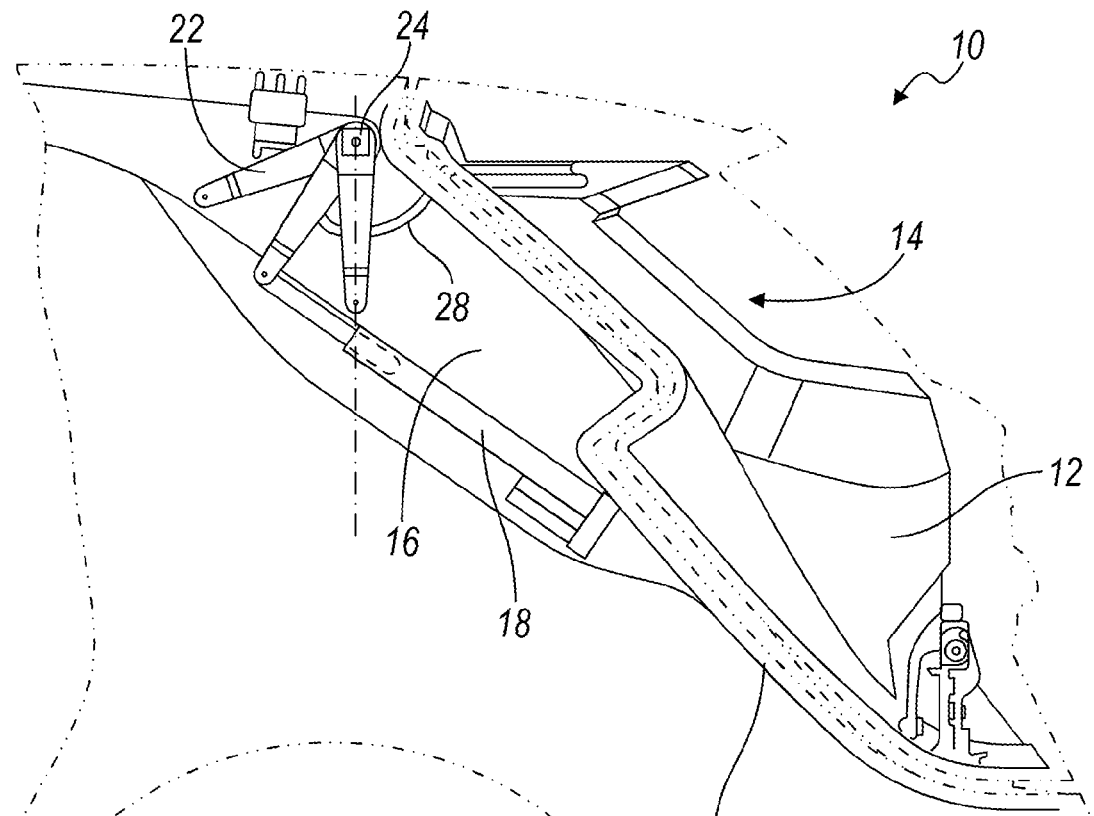
FIG. 2 is a side view of a liftgate actuating mechanism in relation to a rear portion of a vehicle.

Referring to FIGS. 1 and 2, a vehicle 10 is provided. The vehicle 10 may be a hatchback, van, sports utility vehicle (SUV), a station wagon or the like in which a liftgate 12 is provided. The liftgate 12 is a rear door that provides access to a rear cargo area in the vehicle 10, such as a rear storage compartment 14.

When closed, outer edges of the liftgate 12 abut a rearward-most pillar, or rear pillar 16. The rear pillar 16 can refer to a typical "D" pillar in a vehicle, but may refer to a "C" pillar or any rearward-most pillar in the vehicle 10. The rear pillar provides structural support to the vehicle 10, and can be filled with insulation such as foam to reduce noise, vibration, and/or provide more structural integrity to the vehicle 10.

Referring to FIG. 2, an arm 18 is provided for opening and closing the liftgate 12 by refracting and extending, as will be discussed with reference to FIGS. 3A-3B. The arm 18 can be in the form of any mechanism sufficient to extend and retract, even while subjected to high loads. For example, the arm 18 may be a hydraulic arm, powered by a hydraulic pump with fluid lines connected the arm 18 to the pump. The arm 18 may also be a threaded rod with a plunger in which a motor turns a nut or the like around the threaded rod to move the plunger linearly to extend and retract a portion of the arm 18. Other mechanisms are known in the art to open and close the liftgate 12.

The arm 18 is connected at one end to a vehicle body 20. This connection point may be a rigid connection such as a welded connection which would not allow any angular movement of the arm 18. Alternatively, the arm 18 may be pivotally connected to the vehicle body 20 such that the arm 18 is permitted to pivot or rotate as the arm extends and retracts.

The arm 18 is also pivotally connected at another end to a lever 22. The lever 22 extends generally perpendicular to a longitudinal crossbar 24 that extends across the width of the vehicle 10. The lever 22 may be separately-attached to the crossbar 24, or alternatively may be a singular molded unit with the crossbar 24. The lever 22 connects the arm 18 to the crossbar 24 in an offset manner such that the arm 18 extends and retracts in an offset disposition relative to the crossbar 24. As the arm 18 extends and retracts, the lever 22 rotates or pivots about a longitudinal axis of the crossbar 24, causing the crossbar 24 to also rotate about its longitudinal axis. The crossbar 24 is secured to an upper portion of the liftgate 12 via a bracket 28, which translates rotational movement of the crossbar 24 into an opening and closing of the liftgate 12. The bracket 28 may be a gooseneck bracket in which a curved portion is provided to allow for sufficient rotation of the bracket 28 around the crossbar 24.

Figure 3A:
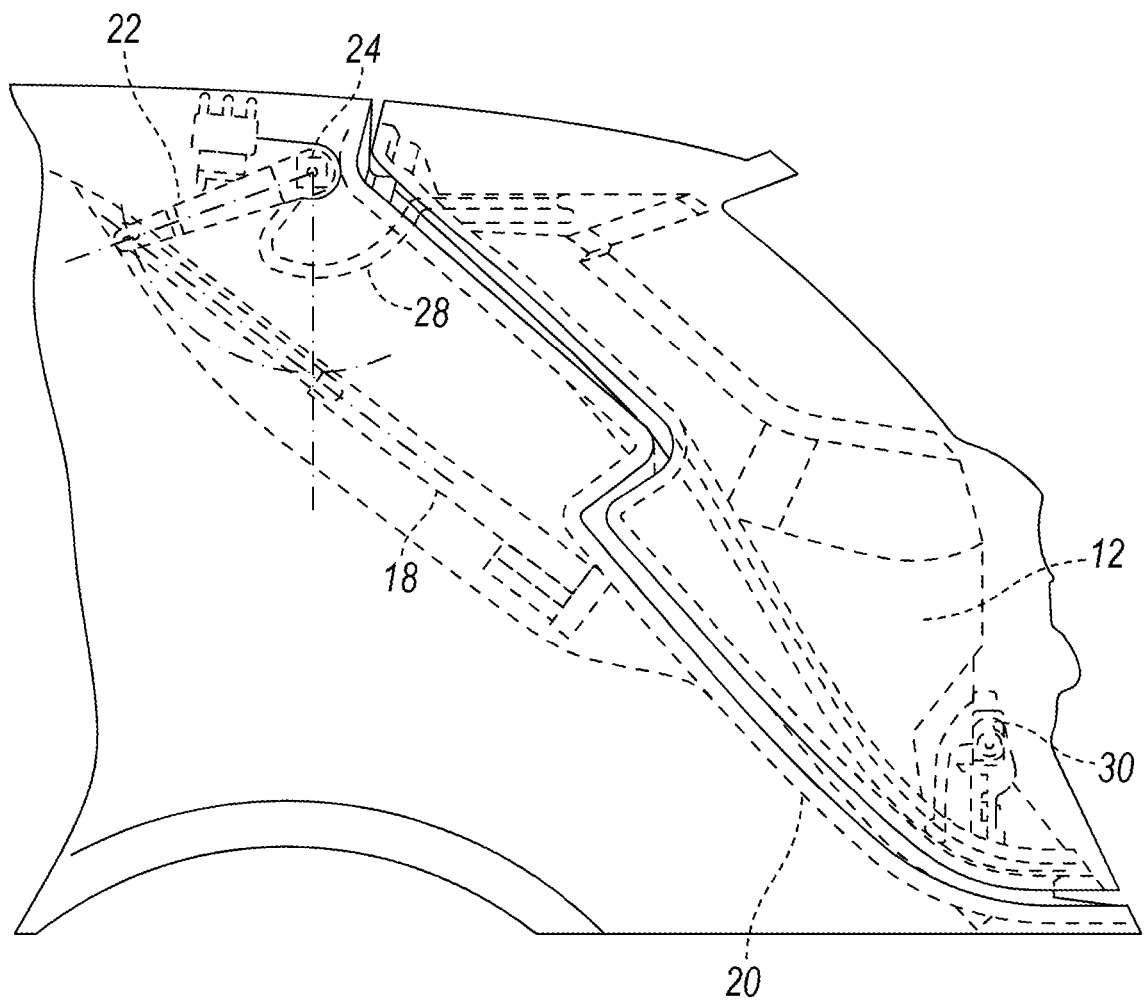
FIG. 3A is a side view of the liftgate and liftgate actuating mechanism in a closed position.
Figure 3B:
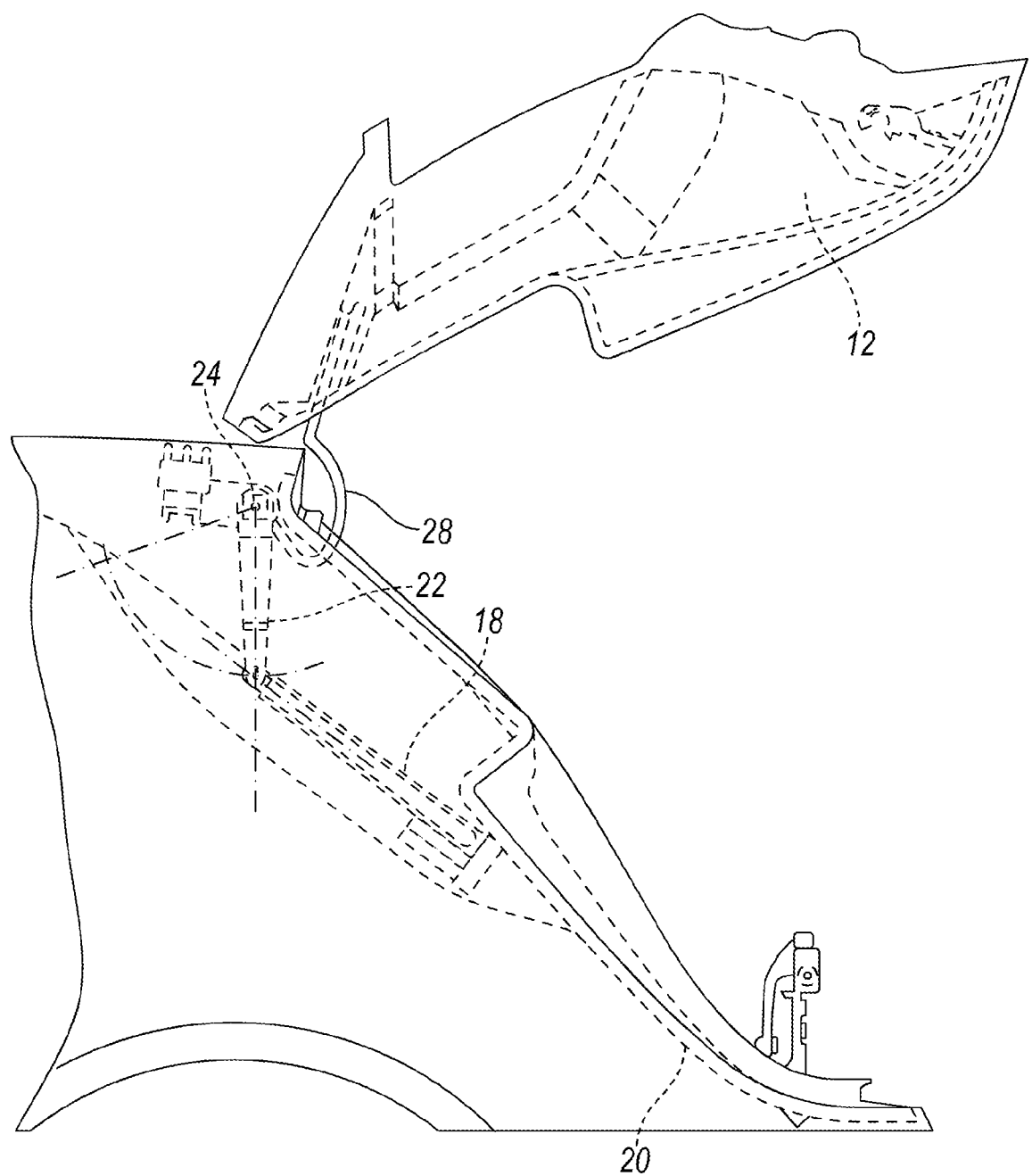
FIG. 3B is a side view of the liftgate and liftgate actuating mechanism in an open position.

Referring to FIGS. 3A and 3B, the movement of the liftgate 12 between a closed position (FIG. 3A) and an open position (FIG. 3B) is illustrated. First, starting with the closed position of FIG. 3A, the liftgate 12 is secured to the vehicle body 20 via a latch or lock (not shown). In this position, the arm 18 is fully extended and the lever 22 is in an upward-most rotational position. When the arm 18 is fully extended, the lever 22 of the crossbar 24 is positioned such that the bracket 28 maintains the liftgate 12 in the closed position.

When the liftgate 12 is desired to be open, the arm 18 retracts and consequently rotates the lever 22 counter-clockwise (from the perspective illustrated in FIG. 3B). The rotation of the lever 22 rotates the crossbar 24, which in turn causes the attached bracket 28 to rotate in the same direction, thereby causing the liftgate 12 to open.

According to embodiments described in the present disclosure, the arm 18 is extended during normal driving and parking of the vehicle (i.e., while the liftgate 12 is closed). The normal position of the arm 18 being extended provides significant advantages. Similarly, retracting the arm 18 to open the liftgate 12 (rather than extending the arm 18 to open the liftgate 12) can provide significant advantages. For example, the arm 18 can be positioned at a similar angle within the vehicle 10 relative to the rear pillar 16 such that it is easily concealed by the rear pillar 16. Furthermore, less power can be utilized to retract the arm 18 to open the liftgate 12 compared to the power need to extend the arm 18 to open the liftgate 12. An additional benefit is provided in the indirect connection to the liftgate 12 such that if the arm 18 were instead attached directly to the liftgate 12, the arm 18 may be visible when opening and closing the liftgate 12.

According to multiple embodiments of the present disclosure, the arm 18 is not attached to the liftgate 12 directly and therefore is not viewable when opening and closing the liftgate 12. Rather, the arm 18 is attached to the lever 22 and can therefore be concealed by the rear pillar 16 (as also illustrated in FIG. 1). It should be understood that the term "concealed" is intended to have an ordinary meaning, in that the arm 18 and/or lever 22 are substantially hidden from the view of a person standing behind the vehicle 10 when the liftgate 12 is opening and closing. Examples of such concealing include the arm and/or lever being secured to the vehicle body 20 while being at least partially or fully disposed within the rear pillar 16. Another example of being concealed includes the arm 18 and/or lever 22 being at least partially or completely positioned between the rear pillar 16 and the interior trim of the vehicle 10. Another example includes the arm 18 and/or lever 22 being secured to the vehicle body 20 at a location more forward in the vehicle compared to the rear pillar 16 such that the rear pillar 16 is in between the arm 18 and/or lever 22 and a person's line of sight when standing behind the vehicle 10. The concealment of the arm 18 and/or lever 22 is made possible due to the position of the arm 18 being offset from the crossbar 24 via the lever 22, in which movement of the arm 18 indirectly moves the liftgate 12 via the lever 22.

A power supply 30 provides power to the arm 18 in order to retract and extend an end portion 32 of the arm 18. Examples of the power supply 30 include an electric motor, a hydraulic pump with fluid lines, or a power cable drive. Other embodiments of the power supply mechanism are known in the art to actuate the arm 18. The power supply 30 can also be electrically connected to a controller and a computer within the vehicle that actuates the liftgate 12. The power supply 30 may be located anywhere in the vehicle 10, including near the rear floor of the storage compartment 14, or adjacent to the arm 18. A separate pump may also be adjacent to the arm for supplying hydraulic fluid within the arm 18.

Figure 4:
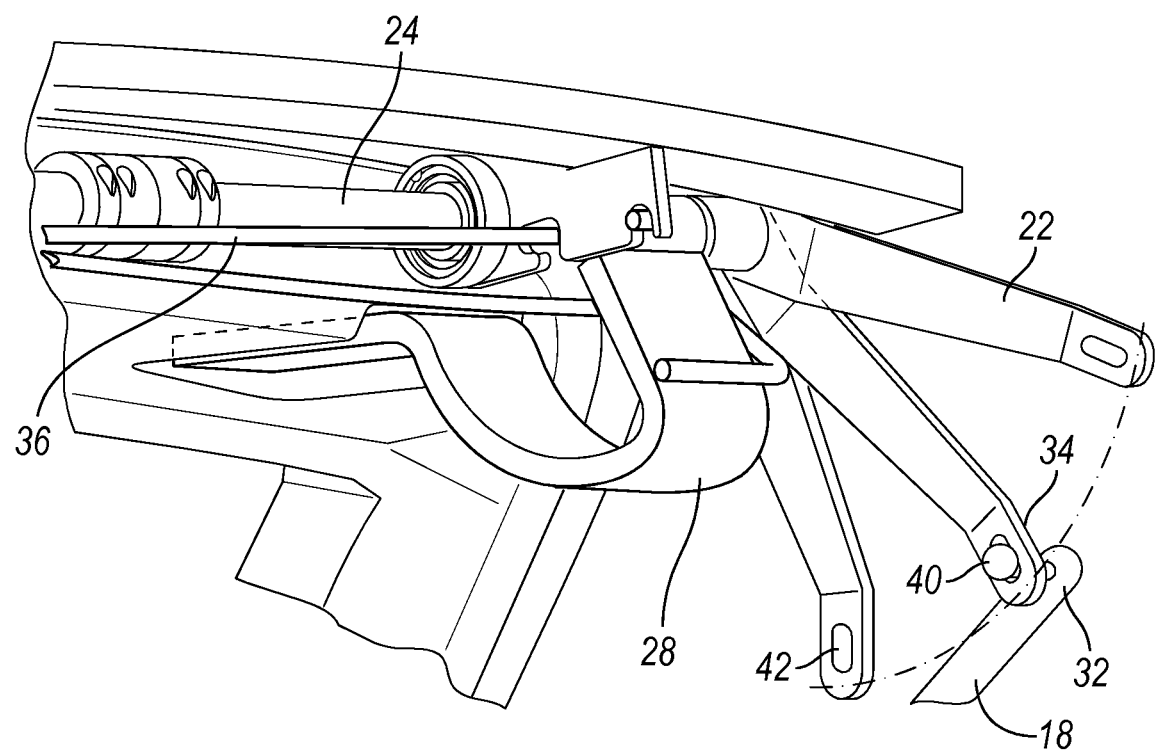
FIG. 4 is a perspective view of an arm and lever mechanism of the liftgate actuating mechanism.

Referring to FIG. 4, a detailed illustration of the arm 18, lever 22, crossbar 24 and bracket 28 is illustrated. These elements can collectively be referred to as part of a liftgate actuating subassembly, liftgate actuating system, or liftgate actuating mechanism. The arm 18 is provided with an end portion 32 that connects to a corresponding end portion 34 of the lever 22. Linear movement of the arm 18 translates into rotational movement of the lever 22, which correspondingly rotates the crossbar 24, as previously described.

Similar to FIGS. 1-3, FIG. 4 shows one lever 22 in three alternative positions to illustrate the movement of the lever 22. It is intended that one lever 22 is utilized, and that rotation of the one lever 22 is sufficient to rotate the crossbar 24. However, it should be understood that multiple levers 22 may be utilized, in which the arm 18 or a plurality of arms 18 are connected to one or more levers 22 to provide more power to rotate the crossbar 24.

Figure 5:
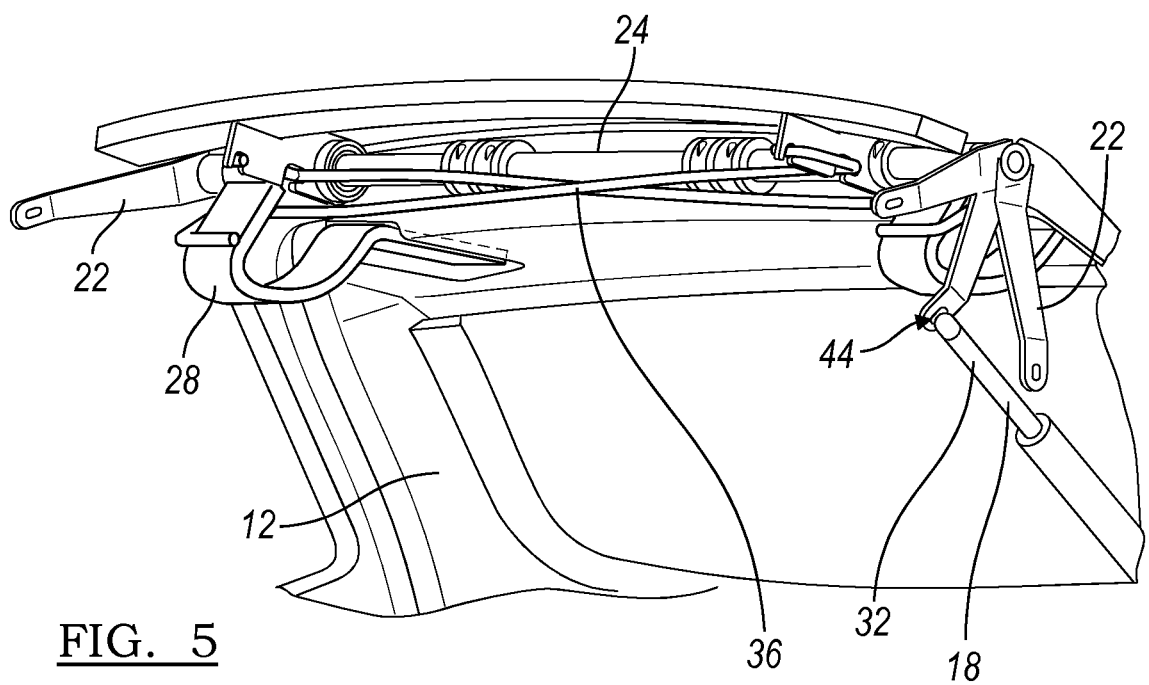
FIG. 5 is a perspective view of the liftgate actuating mechanism in a closed position.

Referring to FIGS. 4 and 5, one or more torsion springs 36 are provided. The torsion springs 36 may inter-connect portions of the brackets 28 and the crossbar 24. The torsion springs 36 help balance the weight of the liftgate 12 when opening and closing. The illustrated torsion springs are especially beneficial in liftgates 12 in which a gooseneck-shaped bracket 28 is utilized.

Referring to FIG. 5, a view of the liftgate actuating system as seen from toward the front of the vehicle 10 is illustrated. In this embodiment, only one arm 18 and one lever 22 are included and provide sufficient force to open and close the liftgate 12. It should be understand that one, two, or more arms 18 may be provided.

As previously discussed, the arm 18 may be pivotally connected to the vehicle body 20 or alternatively may be fixedly mounted to the vehicle body 20 such that the arm 18 is not able to pivot. In an embodiment in which the arm 18 is fixedly connected to the vehicle body 20, the arm 18 may include a protrusion 40 and the lever 22 may include a corresponding groove, slot or opening 42 to receive the protrusion at the connection point 44 to thereby connect the arm 18 and the lever 22. As the arm 18 linearly extends or retracts causing the lever 22 to rotate, the protrusion 40 slides within the opening 42. In an embodiment in which the arm 18 is pivotally connected to the vehicle body, the protrusion 40 and opening 42 may not be necessary.

The present disclosure has described a system for actuating a liftgate 12 of a vehicle 10. It should be understood that the teachings of the present disclosure can be utilized in various fashions and in various automobiles. For instance, a plurality of external sensors may be provided that enable vehicle to actuate the liftgate 12 in response to detecting a human presence. A key fob may also be provided that, when pressed, commands the power source to actuate the liftgate 12 to either open or close the liftgate 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a liftgate;
   a rotatable crossbar attached to the liftgate;
   a lever extending from the crossbar; and
   a retractable arm having a first end attached to a vehicle body and a second end pivotally connected to the lever;
   wherein the retractable arm and the lever are at least partially disposed within a rear pillar of the vehicle, and wherein retraction of the arm from an extended position to a retracted position pivots the lever to rotate the crossbar and open the liftgate.

2. The vehicle of claim 1, wherein the arm is extendable such that extension of the arm pivots the lever to rotate the crossbar and close the liftgate.

3. The vehicle of claim 1, further comprising a bracket attaching the crossbar to the liftgate, such that rotation of the crossbar rotates the bracket about the crossbar to open the liftgate.

4. The vehicle of claim 3, wherein the bracket includes a curved portion such that the bracket rotates around the crossbar during rotation and the liftgate rotates around the crossbar and offset from the crossbar.

5. The vehicle of claim 1, wherein the first end of the arm is fixed to the vehicle body, and wherein the lever defines a slot or groove therein for attachment with the second end of the arm to enable the arm to move laterally relative to the lever during retraction.

6. A mechanism for actuating a liftgate of a vehicle, comprising:
   a crossbar attached to the liftgate;
   a lever extending from the crossbar and at least partially disposed within a rearward pillar of the vehicle; and
   a retractable arm connected to and offset from the crossbar via the lever;
   wherein retraction of the arm rotates the lever and the crossbar to open the liftgate.

7. The mechanism of claim 6, wherein the arm is at least partially disposed within a rearward pillar of the vehicle.

8. The mechanism of claim 6, wherein the arm is extendable such that extension of the arm pivots the lever to rotate the crossbar and close the liftgate.

9. The mechanism of claim 6, wherein the crossbar is attached to the liftgate via a gooseneck bracket, such that retraction of the arm rotates the lever and the crossbar to rotate the gooseneck bracket about the crossbar and open the liftgate.

10. The mechanism of claim 6, wherein the crossbar has a longitudinal axis and the lever extends from the crossbar generally transverse to the longitudinal axis.

11. The mechanism of claim 6, wherein the lever and the crossbar are a singular molded unit.

12. A subassembly for opening and closing a liftgate of a vehicle, comprising:
    a rotatable crossbar attached to both a vehicle body and the liftgate; and
    a retractable arm at least partially concealed by a rearward pillar of the vehicle, the arm attached to and offset from the crossbar via a lever, wherein the arm is extendable such that extension of the arm pivots the lever to rotate the crossbar and close the liftgate.

13. The subassembly of claim 12, wherein the arm and the lever are at least partially disposed within the rearward pillar of the vehicle.

14. The subassembly of claim 12, wherein retraction of the arm pivots the lever to rotate the crossbar and open the liftgate.

15. The subassembly of claim 12, wherein the arm has a first end portion connected to a vehicle body and a second end portion pivotally connected to the lever.

16. The subassembly of claim 12, wherein the lever is at least partially disposed within the rearward pillar of the vehicle.

17. The subassembly of claim 12, further comprising a bracket connecting the crossbar to an upper portion of the liftgate such that rotation of the crossbar opens and closes the liftgate.

* * * * *